Jan. 16, 1951      A. P. CHALIFOUX      2,538,234
SANDING DEVICE FOR VEHICLES
Filed Jan. 25, 1947
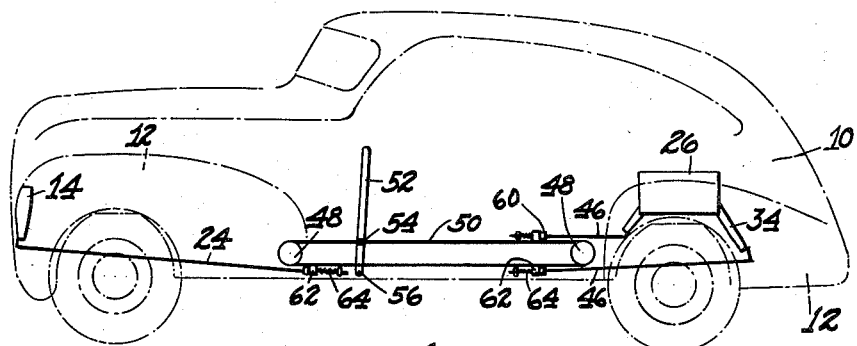
Fig. 1.
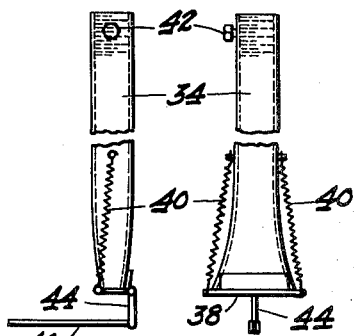
Fig. 4.    Fig. 5.
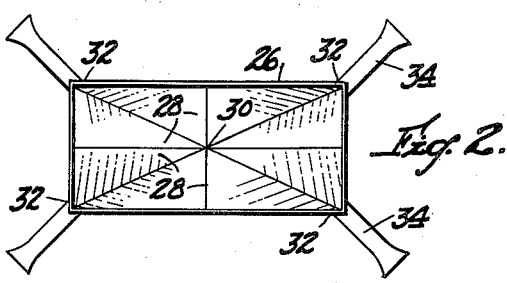
Fig. 2.
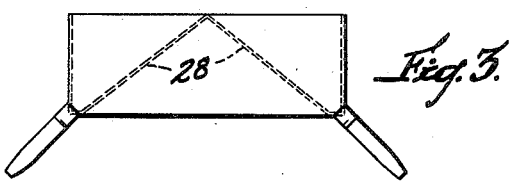
Fig. 3.
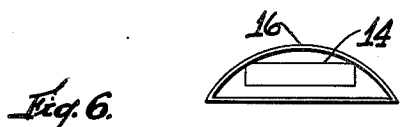 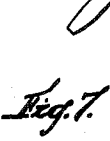
Fig. 6.    Fig. 7.
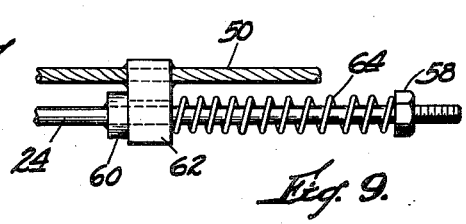
Fig. 9.
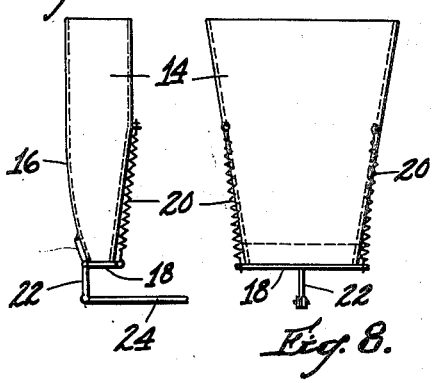
Fig. 8.
Inventor:
Albert P. Chalifoux
By Charles R. Fay
Attorney Patented Jan. 16, 1951

2,538,234

UNITED STATES PATENT OFFICE 2,538,234

SANDING DEVICE FOR VEHICLES

Albert P. Chalifoux, Fitchburg, Mass.

Application January 25, 1947, Serial No. 724,363

3 Claims. (Cl. 291—26)

This invention relates to new and improved devices and constructions providing for sanding at the proper positions to increase the traction of the wheels of a vehicle and to reduce the danger of skidding when traveling over icy pavements.

The principal objects of the invention reside in the provision of a sanding device as above stated and including sand boxes or receptacles conforming to and located on the inside surfaces of the front fenders of a vehicle so as to be completely concealed, and the provision of a sand box or receptacles located between the rear wheels of the vehicle in concealed position, the rear sand box being provided with four spouts, two of which are adapted to deliver sand in advance of the rear wheels and the other two of which are adapted to deliver sand at the rear of the rear wheels; the provision of a sanding device as above stated including control means constructed and arranged to be effective to simultaneously cause the sand boxes to deliver sand in advance of the four wheels or selectively to the rear of the rear wheels only and including manual means operable to accomplish this purpose; and the provision of control means as aforesaid comprising an endless belt trained over a pair of pulleys, to one run of which is attached a lever pivoted to the vehicle at a point removed from the connection of the lever to the belt, and including valve means on each spout having connections with the belt in such a way as to provide for opening the valve of the forward sand boxes and those of the rear wheel sand box in advance of the rear wheels simultaneously, or selectively to open the valves of the rear wheel sand box to deliver sand to the rear of the rear wheels alone.

Other objects and advantages of the invention will appear hereinafter.

Reference is to be had to the accompanying drawings in which

Fig. 1 is a view in side elevation illustrating the invention;

Fig. 2 is a top plan view of the rear sand box;

Fig. 3 is a view in front elevation thereof;

Fig. 4 is a view in side elevation of one of the spouts for the rear sand box;

Fig. 5 is a view in front elevation thereof;

Fig. 6 is a view in side elevation of a front sand box;

Fig. 7 is a top plan view thereof;

Fig. 8 is a view in front elevation thereof; and

Fig. 9 is an enlarged view showing the connection used between the control means and the sand box spouts.

As shown in Fig. 1 there is a vehicle 10 having fenders 12 shown in broken lines. At the inside surface of each of the front fenders there is secured a sand box 14 having a surface as at 16 conforming to the shape of the fender for securement thereto in concealed position. This sand box is provided with an opening at the bottom thereof, such opening being closed by a valve or trap door 18 held in closed position by a spring or springs 20. The trap door 18 forms a part of a bell crank having an arm 22 pivotally secured to a rod 24, said rod extending rearwardly for a purpose to be described.

Over the rear axle and between the rear wheels of the vehicle there is disposed a rectangular or otherwise conveniently shaped sand box 26 having a series of partitions 28 therein forming V-shaped funnels leading down from the center 30 to the corners 32 of the box so that sand will naturally flow to these corners. At each corner there is provided a spout 34 each of which is provided with a trap door or valve 36 maintained in closed position by springs 40 similar to the construction for the front sand boxes 14. These spouts may be secured to the box 26 in any desired way, as by bolts 42 or the like. Each trap door 38 forms a part of a bell crank having an arm 44 to which is connected rods 46 extending forwardly of the car.

A pair of pulleys 48 are mounted on the vehicle as shown in Fig. 1 and over these pulleys there is trained an endless belt 50. A lever 52 is secured as at 54 to the belt and this lever is pivoted at 56 at a point removed from the connection 54 so that as the lever is pivoted the belt is traveled for a short distance in either direction selectively.

Each of the rods 24 and 46 is provided with a head 58 and a fixed abutment 60 spaced therefrom. Between these heads and slidable on the rods there is a collar 62 secured to the belt 50 and between the collar and head 58 there is disposed a compression spring 64.

In the operation of the device the lever 52 is swung out for instance forwardly in which case the collars 62 for the spouts in advance of the wheels are not affected, but the collar 62 for the lower rod 46 will press said rod to the rear of the wheels to deposit sand behind the rear wheels only. If the lever is pulled toward the rear of the vehicle the spout 34 at the rear of the rear wheels will not be affected but the spouts in advance of all four wheels will be opened to deposit sand in front of the wheels.

This invention will be seen to provide a device where all four wheels may be sanded in advance thereof or wherein the rear wheels may be sanded to the rear thereof, so that no matter what conditions are encountered sand is quickly and easily deposited at the desired position.

Having thus described my invention and the advantages thereof, I do not wish to be limited to the details herein disclosed otherwise than as set forth in the claims but what I claim is:

1. Sanding devices for vehicles having front and rear wheels comprising a sand box in advance of a front wheel, a second sand box adjacent a corresponding rear wheel, a pair of spouts on the second sand box, one spout directing sand in advance of the rear wheel and the other spout directing sand to the rear of the rear wheel, a closure on each spout, a closure on the front wheel sand box, means to normally maintain the closures closed, and means to open the closures of the front wheel sand box and the spout in advance of the rear wheel, or selectively the spout to the rear of the rear wheel only, said means comprising an endless belt, a lever pivoted to the vehicle body, a connection from the lever to the belt at a point spaced from the lever pivot, so that the belt is movable in either of two directions depending on the direction of pivotal motion imparted to the lever, a separate connection on the belt for each closure, each connection comprising a lug, a rod passing therethrough, and a spring to tend to hold the rod retracted relative to the lug, each rod being connected to a closure, each rod being movable by its lug in one direction to open the closure to which it is connected as the belt moves in said direction under influence of the lever, and each rod being held against movement as the belt moves in the relatively opposite direction so that the lugs load the springs but not affecting the rods, the springs tending to maintain the belt and lever in position wherein all the closures are closed.

2. The sanding device of claim 1 wherein the front wheel sand box closure and the closure of the spout in advance of the rear wheel are actuated together for simultaneous opening, the closure of the spout to the rear of the rear wheel being thereby unaffected.

3. The sanding devices of claim 1 wherein certain connections are secured to the belt at one run thereof and other connections are secured to the other run of the belt.

ALBERT P. CHALIFOUX.

REFERENCES CITED

The following references are of record in the file of this patent:

UNITED STATES PATENTS

| Number | Name | Date |
|---|---|---|
| 748,210 | McConnell | Dec. 29, 1903 |
| 771,539 | Doyle et al. | Oct. 4, 1904 |
| 1,081,477 | Williams | Dec. 16, 1913 |
| 1,244,726 | Goehring et al. | Oct. 30, 1917 |
| 1,301,103 | Cassidy | Apr. 22, 1919 |
| 1,469,627 | Duffner | Oct. 2, 1923 |
| 1,794,032 | Rittmann | Feb. 24, 1931 |
| 2,177,340 | Young | Oct. 24, 1939 |

FOREIGN PATENTS

| Number | Country | Date |
|---|---|---|
| 92,957 | Germany | Jan. 20, 1897 |